United States Patent US 11,017,255 B2
Lee (45) Date of Patent: May 25, 2021

(54) APPARATUS, METHOD AND COMPUTER PROGRAM FOR ANALYZING IMAGE (71) Applicant: CRESCOM Co., Ltd., Gyeonggi-do (KR)

(72) Inventor: Jae Joon Lee, Gyeonggi-do (KR)

(73) Assignee: CRESCOM CO., LTD.

( * ) Notice: Subject to any disclaimer, the term of this patent is extended or adjusted under 35 U.S.C. 154(b) by 343 days.

(21) Appl. No.: 16/301,703

(22) PCT Filed: Aug. 9, 2018

(86) PCT No.: PCT/KR2018/009064
§ 371 (c)(1),
(2) Date: Nov. 14, 2018

(87) PCT Pub. No.: WO2019/054638
PCT Pub. Date: Mar. 21, 2019

(65) Prior Publication Data
US 2021/0034905 A1 Feb. 4, 2021

(30) Foreign Application Priority Data
Sep. 13, 2017 (KR) .......... 10-2017-0117463
May 21, 2018 (KR) .......... 10-2018-0057547

(51) Int. Cl.
G06K 9/32 (2006.01)
G06K 9/46 (2006.01)
(Continued)

(52) U.S. Cl.
CPC .......... G06K 9/3233 (2013.01); G06K 9/46 (2013.01); G06K 9/6256 (2013.01); G06N 3/04 (2013.01); G06N 3/08 (2013.01)

(58) Field of Classification Search
CPC ...... G06K 9/3233; G06K 9/46; G06K 9/6256; G06K 9/62; G06K 9/4628; G06K 9/6274;
(Continued)

(56) References Cited

U.S. PATENT DOCUMENTS 7,853,072 B2 * 12/2010 Han .................. G06K 9/4642
382/155
8,582,807 B2 * 11/2013 Yang ................. G06K 9/4628
382/103

(Continued)

FOREIGN PATENT DOCUMENTS

JP 2003175023 6/2003
JP 2009048620 3/2009
(Continued)

OTHER PUBLICATIONS

International Search Report for PCT/KR2018/009064, with English translation, dated Nov. 15, 2018, 94 pages.
(Continued)

Primary Examiner — Michael S Osinski
(74) Attorney, Agent, or Firm — Adsero IP (57) ABSTRACT The present disclosure relates to an image analysis method, system, and computer program. The image analysis method of the present disclosure includes: receiving a query image; extracting one or more regions of interest from the query image; calculating a first feature for each of the regions of interest by respectively applying the regions of interest to one or more ROI (region of interest) feature extraction models independently learned in order to extract features of the regions of interest; and calculating analysis values of the query image by applying the first features of the regions of interest to a pre-learned integration analysis model. According to the present disclosure, it is possible to reduce the influence on an analysis model by an error that training data created for map learning of an entire image may have, and
(Continued)

it is also possible to increase learning accuracy and objectivity of a deep neural network.

15 Claims, 5 Drawing Sheets

(51) Int. Cl.
*G06K 9/62* (2006.01)
*G06N 3/04* (2006.01)
*G06N 3/08* (2006.01)

(58) Field of Classification Search
CPC .... G06K 9/627; G06K 9/4671; G06K 9/6267; G06K 9/6232; G06K 9/6262; G06K 9/00288; G06K 2209/055; G06N 3/02; G06N 3/04–084; G06T 2207/20084; G06T 2207/10016; G06T 2207/20081; G06T 7/11; G06T 7/246–248
See application file for complete search history.

(56) References Cited

U.S. PATENT DOCUMENTS

| | | | | |
|---|---|---|---|---|
| 9,830,529 | B2* | 11/2017 | Jetley | G06N 3/0454 |
| 9,965,719 | B2* | 5/2018 | Choi | G06K 9/4628 |
| 10,019,631 | B2* | 7/2018 | Tao | G06K 9/3241 |
| 10,083,502 | B2* | 9/2018 | Ryu | G06K 9/6292 |
| 10,366,302 | B2* | 7/2019 | Yang | G06N 3/04 |
| 10,671,884 | B2* | 6/2020 | Walters | G06F 11/3636 |
| 10,796,206 | B2* | 10/2020 | Kim | G06K 9/6288 |
| 10,853,698 | B2* | 12/2020 | Courtney | G06N 3/06 |
| 10,860,898 | B2* | 12/2020 | Yang | G06F 16/532 |
| 2010/0111392 | A1* | 5/2010 | Valadez | G06T 7/0012 |
| | | | | 382/131 |
| 2011/0164815 | A1* | 7/2011 | Sharma | G06K 9/00664 |
| | | | | 382/165 |
| 2011/0268338 | A1* | 11/2011 | Collins | G06T 5/50 |
| | | | | 382/131 |
| 2014/0099029 | A1* | 4/2014 | Sawides | G06K 9/00221 |
| | | | | 382/197 |
| 2014/0142413 | A1* | 5/2014 | Chang | G16H 50/50 |
| | | | | 600/407 |
| 2015/0302240 | A1* | 10/2015 | Rao | G06K 9/00248 |
| | | | | 382/201 |
| 2016/0104058 | A1* | 4/2016 | He | G06K 9/66 |
| | | | | 382/156 |
| 2016/0148376 | A1* | 5/2016 | Ryu | A61B 8/5223 |
| | | | | 382/131 |
| 2017/0109592 | A1* | 4/2017 | Hwang | G06K 9/00885 |
| 2018/0101748 | A1* | 4/2018 | Yang | G06N 3/08 |
| 2018/0211130 | A1* | 7/2018 | Jiang | G06K 9/6273 |
| 2019/0065817 | A1* | 2/2019 | Mesmakhosroshahi | |
| | | | | G06K 9/4628 |
| 2019/0130574 | A1* | 5/2019 | Li | G06T 7/11 |
| 2019/0164290 | A1* | 5/2019 | Wang | G06F 16/55 |
| 2019/0213448 | A1* | 7/2019 | Peng | G06K 9/00624 |
| 2019/0244358 | A1* | 8/2019 | Shi | G06K 9/00664 |
| 2019/0279014 | A1* | 9/2019 | Fang | G06K 9/4671 |
| 2019/0279033 | A1* | 9/2019 | Price | G06K 9/6256 |
| 2019/0332889 | A1* | 10/2019 | Courtney | G06K 9/627 |
| 2019/0355142 | A1* | 11/2019 | Croxford | G06T 7/60 |
| 2020/0020097 | A1* | 1/2020 | Do | G06K 9/627 |
| 2020/0026987 | A1* | 1/2020 | Gudla | G06N 3/08 |
| 2020/0193232 | A1* | 6/2020 | Wang | G06N 3/0454 |
| 2020/0257914 | A1* | 8/2020 | Wu | G06K 9/00906 |
| 2020/0320769 | A1* | 10/2020 | Chen | G06K 9/6256 |
| 2021/0027098 | A1* | 1/2021 | Ge | G06T 11/20 |

FOREIGN PATENT DOCUMENTS

| | | |
|---|---|---|
| KR | 20160063128 | 6/2016 |
| KR | 20160096460 | 8/2016 |
| KR | 101657495 | 9/2016 |
| KR | 20170026264 | 3/2017 |
| KR | 20170045813 | 4/2017 |
| KR | 20180038169 | 4/2018 |
| KR | 101857624 | 5/2018 |
| KR | 20180064863 | 6/2018 |

OTHER PUBLICATIONS

Notice of Allowance for 2019-020825171, dated Mar. 21, 2019, 2 pages (In Korean language).
Office Action for JP Application 2020-515931, dated Mar. 30, 2021, 5 pages (in Japanese language).
Suzuki et al., "Anaysis for Deep Convolutional Neural Network feature with Diffuse Lung Disease classification", "Deep Convolutional Neural Network" IPSJ (Information Processing Society of Japan) SIG Technical Report, vol. 2015-MPS-103 No. 29.

* cited by examiner

APPARATUS, METHOD AND COMPUTER PROGRAM FOR ANALYZING IMAGE

CROSS-REFERENCE TO RELATED APPLICATION

This application claims priority to and is a 35 U.S.C. § 371 national phase application of PCT/KR2018/009064, filed on Aug. 9, 2018 entitled "APPARATUS, METHOD AND COMPUTER PROGRAM FOR ANALYZING IMAGE", which application claims priority to and the benefit of Korean Application KR 10-2018-0057547, filed May 21, 2018; the disclosures of which are incorporated herein by reference in their entirety.

TECHNICAL FIELD

The present disclosure relates to an image analysis method, system, and computer program, and more particularly, a method, system, and computer program that analyzes images using machine learning.

BACKGROUND ART

An image analysis technology is widely used in various fields, and particularly, it increases the accuracy of identifying objects using a machine learning algorithm, it is more actively used.

When a query image is received in image analysis, a computer classifies features of the query image (or the features of the object in the query image) through a model learned on the basis of machine learning. A user can easily know what objects are included in query image, for example, what products are included in the image or what features the objects have-for example, what colors and patterns products have, and whose faces the faces included in the image are from the analysis result on a query image, so the user can quickly classify and understand a lot of image data using them.

It is required to learn the features of object to be identified to identify the objects and an instruction technique that teaches a large amount of identified data to a machine learning model.

Methods of creating an analysis model using a machine learning technique and analyzing a query image through a learned analysis model in the related art can be classified into two types.

First, there is a method of creating an analysis model for the entire image that is a learning target, and analyzing the image. When the entire image is input and taught to a machine learning model, the analysis model learns and uses features in the image for classification.

Second, there is a method of extracting regions of interest (ROI) in an image, training an analysis model for the regions of interest that are learning targets, and analyzing the image on the basis of the regions of interest. The regions of interest are generally specified by specialists in the fields. The specialists in the fields extract main regions of interest using their experiences and knowledge and analyze the image on the basis of the regions of interest, thereby being able to increase the accuracy in image classification and analysis.

However, these two methods have limits. In analysis of the entire image as a learning target, when complication in the image is larger or several characteristic portions in the image, the classification result on the same query image (analysis target) may be changed. This is because the portions that are considered as features depend on the subjects that create instruction learning data, the identification values may be changed. The classification method based on the entire image is considerably deteriorated in reliability of the analysis result unless accuracy and objectivity of learning data that is used to create an analysis model are not secured, so it may depend on intuitive determination on the entire image.

Further, the classification method based on the entire image analyzes even portions not having important meanings when classifying an image, so noise unrelated to query image identification may have an adverse influence on the automatic analysis result of the image.

On the other hand, a method of analyzing features of regions of interest has a limit in that the features of the other regions except for regions of interest of the entire image may not be reflected or the importance of selected regions of interest may not be high.

DETAILED DESCRIPTION OF THE INVENTION

Technical Problem

An image analysis technology is widely used in various fields, and particularly, it increases the accuracy of identifying objects using a machine learning algorithm, it is more actively used.

When a query image is received in image analysis, a computer classifies features of the query image (or the features of the object in the query image) through a model learned on the basis of machine learning. A user can easily know what objects are included in query image, for example, what products are included in the image or what features the objects have, for example, what colors and patterns products have and whose faces the faces included in the image are, from a query image, so the user can quickly classify and understand a lot of image data using them.

It is required to learn the features of object to be identified to identify the objects and a map learning technique that teaches a large amount of identified data to a machine learning model.

Methods of creating an analysis model using a machine learning technique and analyzing a query image through a learned analysis model in the related art can be classified into two types.

First, there is a method of creating an analysis model for the entire image that is a learning target, and analyzing the image. When the entire image is input to a machine learning model, the analysis model learns and uses features in the image for classification.

Second, there is a method of extracting regions of interest (ROI) in an image, training an analysis model for the regions of interest that are learning targets, and analyzing the image on the basis of the regions of interest. The regions of interest are generally specified by specialists in the fields. The specialists in the fields extract main regions of interest using their experiences and knowledge and analyze the image on the basis of the regions of interest, thereby being able to increase the accuracy in image classification and analysis.

However, these two methods have limits. In analysis of the entire image as a learning target, when complication in the image is larger or several characteristic portions in the image, the classification result on the same query image (analysis target) may be changed. This is because the portions that are considered as features depend on the subjects that create instruction learning data, the identification values may be changed. The classification method based on the entire image is considerably deteriorated in reliability of the analysis result unless accuracy and objectivity of learning data that is used to create an analysis model are not secured, so it may depend on intuitive determination on the entire image.

Further, the classification method based on the entire image analyzes even portions not having important meanings when classifying an image, so noise unrelated to query image identification may have an adverse influence on the automatic analysis result of the image.

On the other hand, a method of analyzing features of regions of interest has a limit in that the features of the other regions except for regions of interest of an entire image may not be reflected or the importance of selected regions of interest may not be high.

Technical Solution

In accordance with an aspect, an image analysis method of the present disclosure includes: receiving a query image; extracting one or more regions of interest from the query image; calculating a first feature for each of the regions of interest by respectively applying the regions of interest to one or more ROI (region of interest) feature extraction models independently learned in order to extract features of the regions of interest; and calculating analysis values of the query image for identifying the query image by applying the first features of the regions of interest to a pre-learned integration analysis model.

Further, an image analysis system includes: an input unit receiving a query image; a detector extracting one or more regions of interest from the query image; an interest image analyzer calculating a first feature for each of the regions of interest by respectively applying the regions of interest to one or more ROI (region of interest) feature extraction models independently learned in order to extract features of the regions of interest; and an integration analyzer calculating analysis values of the query image for identifying the query image by applying the first features of the regions of interest to a pre-learned integration analysis model, and identifying the query image using the analysis values.

Advantageous Effects

According to the present disclosure described above, it is possible to increase accuracy in image analysis in comparison to the related art.

Further, according to the present disclosure, it is possible to reduce the influence on an analysis model by an error that training data created for map learning of an entire image may have, and it is also possible to increase learning accuracy and objectivity of a deep neural network.

Further, according to the present disclosure, when noise elements that are likely to cause a determination error are included in an image, objectivity and accuracy in image classification can be increased by separately detecting features of main regions of interest in the image and then reflecting the features to final image classification.

Further, according to the present disclosure, it is possible to provide a determination basis and analysis for an image classification result by a deep neural network called a black box.

MODE FOR CARRYING OUT THE INVENTION

The aspects, characteristics, and advantages will be described in detail below with reference to the accompanying drawings, so those skilled in the art may easily achieve the spirit of the present disclosure. However, in description of the present disclosure, detailed descriptions of well-known technologies will be omitted so as not to obscure the description of the present disclosure with unnecessary detail. Hereinafter, exemplary embodiments of the present disclosure will be described with reference to accompanying drawings. The same reference numerals indicate the same or similar components in the drawings and all combinations described in the specification and claims can be feely achieved. It should be understood that, unless not specifically stated, a singular form may include one or more and may include a plural form.

The present disclosure can be applied to various fields, but particularly, can be effectively used for a hand bone image analysis for determining bone age. Bone age plays an important role in estimation of the progress degree of physical growth and the time of stop of growth cessation of juveniles. Accordingly, bone age is used to find out the degree of potential possibility of growth. An age is found out from existence and changes in shape of bones showing the state of combination of an epiphysis and a metaphysic according to ossification of epiphyseal plates.

Hand bone images are generally used for bone age analysis and bone age is generally determined on the basis of the maturity of bones in a GP method or TW method based on atlas.

The GP method is a type that intuitionally sees and identifies the entire image of hand bones to be used for determining bone age, and the TW method is a type that separate regions of interest for main detailed joints from a hand bone image, determines the maturity grades of the regions of interest, and estimates the bone age by generalizing them.

When using the GP method, a medical specialist compares representative images of bone ages with a query image and determines the bone age of the representative image most similar to the query image as the bone age of the query image. However, many study results suggest that, according to the GP method, there may be large differences, depending on readers, and even if reader makes a determination twice, he/she is likely to make different estimations depending on time.

As for the TW method, there are many studies suggesting that there are fewer differences in time-difference classification results among both different and same readers, as compared with the GP method, so it is estimated as having higher accuracy and lower possibility of an error. However, even in the TW method, an error may be generated in classification of maturity grades of regions of interest even though the error is smaller than that of the GP method. Further, there is a limit that other portions except for regions of interest detected as estimation targets are not included in bone age analysis.

These problems also occur even in the case of implementing the GP method and the TW method using machine learning, but according to the present disclosure, it is possible to overcome the problems and considerably improve the accuracy in hand bone image analysis.

Figure 1:
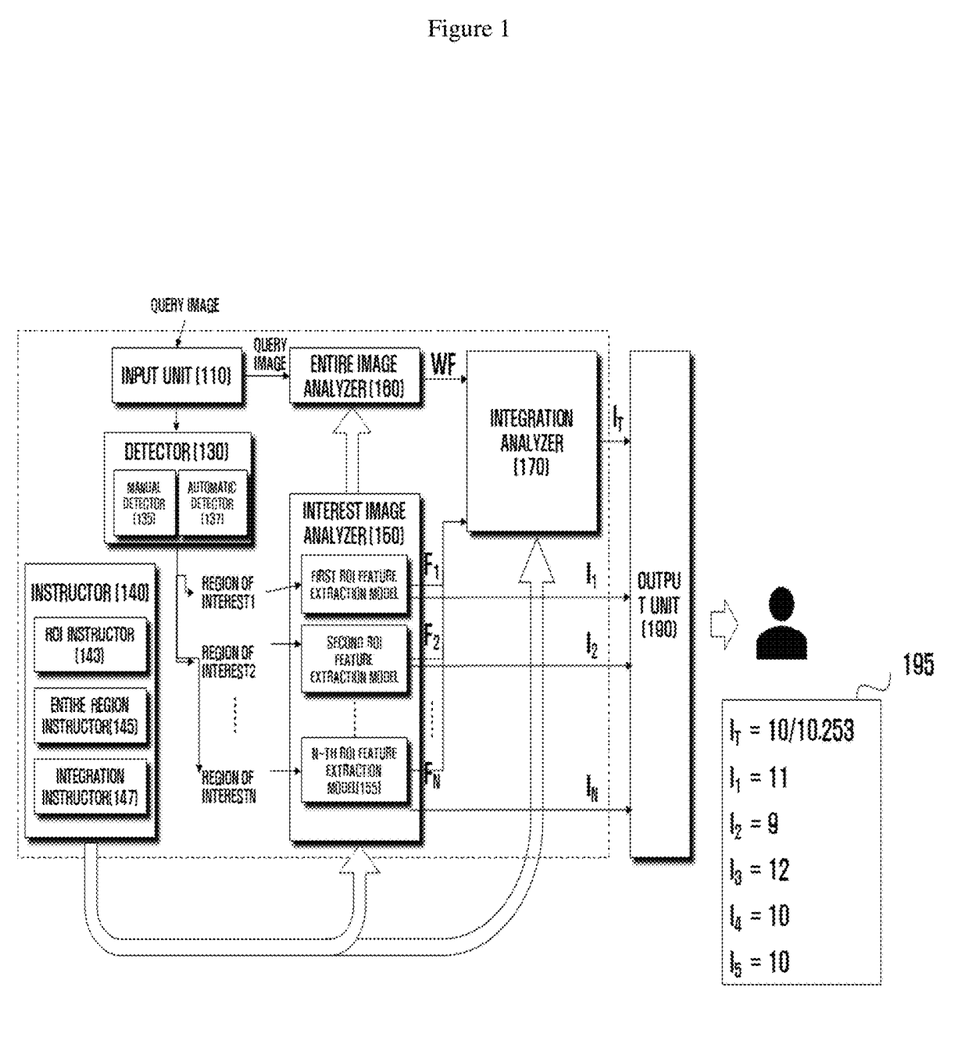
FIG. 1 is a block diagram illustrating an image analysis system according to an embodiment of the present disclosure.
Figure 2:
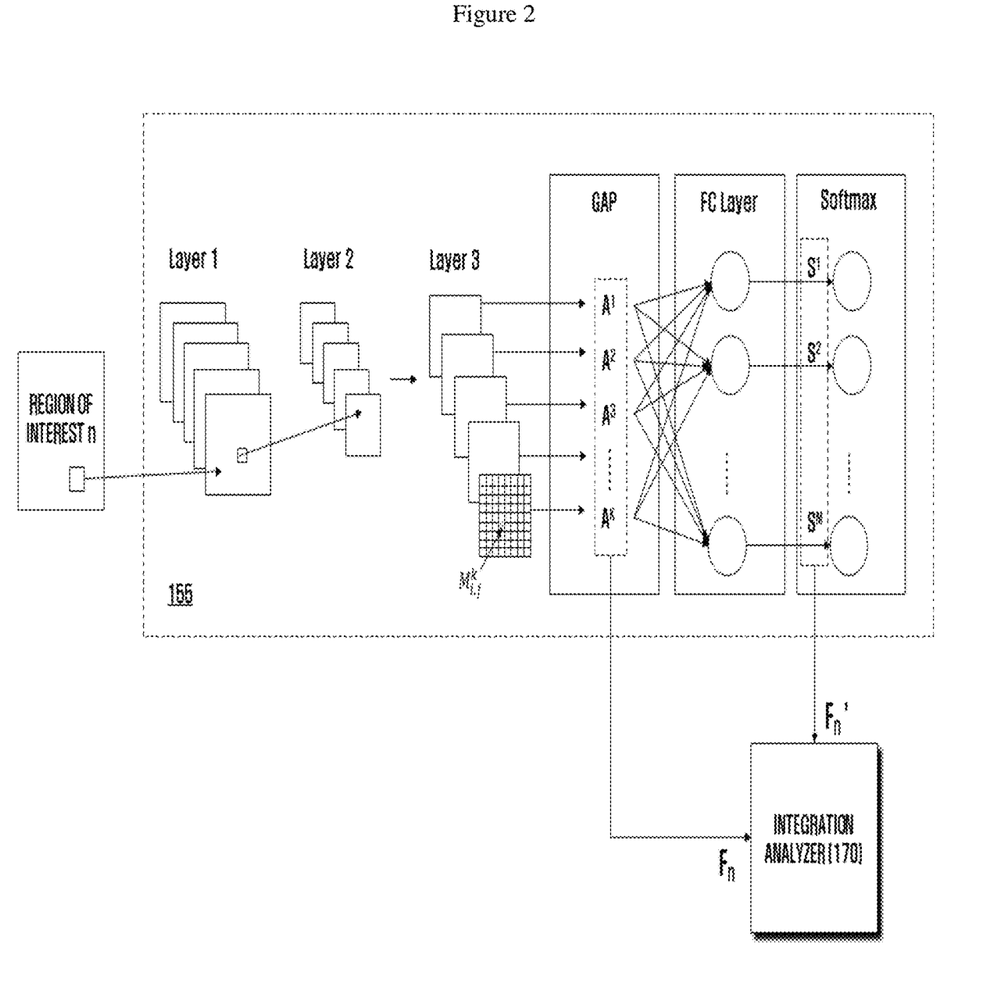
FIG. 2 is a diagram illustrating a feature extraction model according to an embodiment of the present disclosure.

An image analysis system according to an embodiment of the present disclosure is described hereafter with reference to FIGS. 1 and 2.

Referring to FIG. 1, an image analysis system 100 according to an embodiment of the present disclosure includes an input unit 110, detector 130, an interest image analyzer 150, and an integration analyzer 170 and may further include an entire image analyzer 160.

The input unit 110 may be an input module that receives a query image from a user and may be a communication module that receives a query image from another electronic device (not shown) through a wire/wireless network. Alternatively, the input unit 110 may be a capturing module that acquires an image of an object. The query image may be a 2D-color or black-and-white image and may be an image acquired by an imaging apparatus such as an X-ray apparatus, a CT apparatus, or an image acquired by a capturing function of an electronic device. The input unit 110 can transmit the received query image to the entire image analyzer 160 and/or the detector 130.

Figure 3:
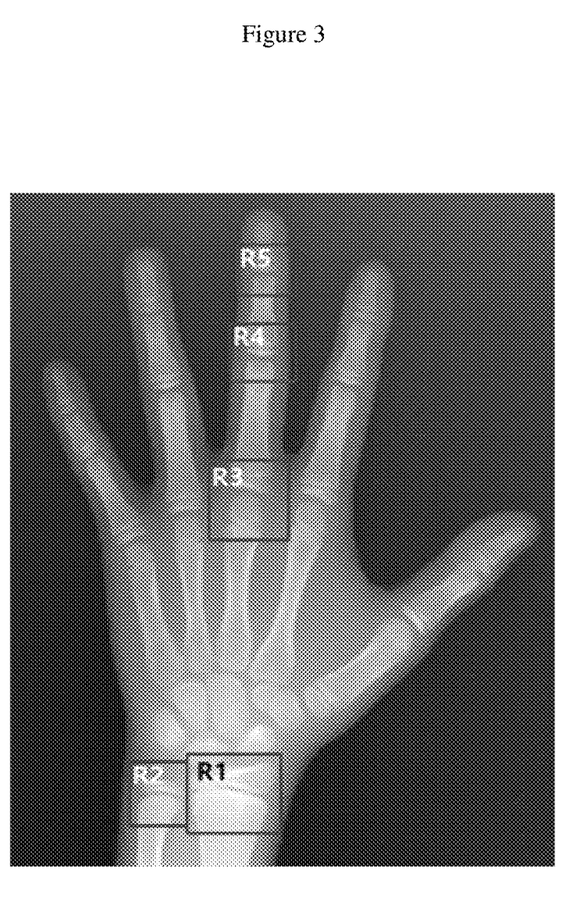
FIG. 3 is a block diagram illustrating ROI extraction according to an embodiment of the present disclosure.

The detector 130 extracts one or more regions of interest from a query image. The region of interest means a specific region having importance in analysis of a query image. The importance of a specific region in machine learning analysis is based on the domain knowledge to which the corresponding image pertains in many cases. That is, analysis of regions of interest is for increasing accuracy by removing noise in other regions except for main regions of interest that have possibility of causing an error in analysis. For example, when receiving a hand bone image shown in FIG. 3 as a query image, the image analysis system 100 can estimate the bone age by analyzing the hand bone image. The detector 130 can extract regions R1 to R5, which are mainly considered for bone age estimation, as regions of interest.

The detector 130 includes a manual detector 135 and an automatic detector 137 and regions of interest can be manually or automatically extracted. The manual detector 135 can extract a region corresponding to position information set by a user as a region of interest. That is, in the example shown in FIG. 3, a user can set in person a region R1 to R5 that is a region of interest in the hand bone image and the manual detector 135 can extract the region designated by the user as a region of interest and transmit the region to the ROI image feature extractor 160.

The automatic detector 137 can extract a region corresponding to a specific region as a region of interest by applying an automatic detection model learned for the specific region in the query image. The specific region means a region that is mainly considered for bone age estimation in the example described above. The automatic detector 137 may include an automatic detection model that is a deep neural network learned (trained and estimated) using a plurality of specific region images to extract a specific image from an entire image. Faster-RCNN based on a deep neural network or a Yolo detection technique may be used for the automatic detection model, but the present disclosure is not limited thereto.

For example, the automatic detector 137 can train the automatic detection module using a plurality of radius images, and in this case, when a hand bone image (an image of all hand bones) is inputted, the automatic detector 137 can extract R1 corresponding to a radius as a region of interest.

The detector 130 can extract one or more regions of interest (regions of interest 1, 2, . . . , N) from the query image and transmit the extracted regions of interest to the interest image analyzer 150.

An instructor 140 may include an ROI instructor 143, an entire region instructor 145, and an integration instructor 147.

The ROI instructor 143 can independently teach one or more ROI feature extraction model and provides it to the interest image analyzer 150. Each ROI feature extraction model is a machine learning model and may be a deep neural network or a regression analysis model composed of one or more layers.

The ROI instructor 143 can train the ROI feature extraction model using a plurality of ROI images classified in accordance with pre-identified, that is, predetermined identification values for region of interest, respectively, as training data. The identification values may be values that are the same type as analysis values of a query image or may be different types of values having correlation with the analysis values of the query image.

For example, when finally determining the bone age of a query image, the ROI instructor 143 may use radius images for bone ages as training data or may use radius images for bone maturity grades (A to I) having correlation with bone ages as training data in order to teach a first ROI (a radius) feature extraction model. That is, the bone maturity grade of the radius R1 in the hand bone image shown in FIG. 4 influences determining the bone age of the entire hand bone image, so it is possible to teach the first ROI feature extraction model using a plurality of radius images grouped for each bone maturity grade.

Accordingly, it is possible to acquire an analysis value of a region of interest by applying a specific region of interest to the learned ROI feature extraction model. That is, by inputting a radius image to the first ROI feature extraction model in this example, it is possible to acquire the bone age or the bone maturity grade of the input radius image as the analysis value of a region of interest.

The entire region instructor 145 is provided, similar to the ROI instructor 143, for training an entire region feature extraction model and providing it to the entire image analyzer 160. The entire region feature extraction model is a machine learning model and may be a deep neural network or a regression analysis model composed of one or more layers.

The entire region instructor 145 can train the entire region feature extraction model using a plurality of entire images classified in accordance with pre-identified, that is, predetermined identification values for an entire image as training data. The identification value may be same type of values as the analysis value of a query image. For example, as described above, in order to determine the bone age of a hand bone image, it is possible to use the entire hand bone image determined as having a specific bone age as training data.

The integration instructor 147 can train an integration analysis model using features (or feature values) extracted through learning for each region of interest and/or an entire region feature value extracted from the entire region instructor. The integration instructor 147 will be described in detail with the integration analyzer 170.

The interest image analyzer 150 can calculate a first feature for each region of interest by respectively applying one or more regions of interest to one or more ROI feature extraction models independently learned in order to extract a feature of each region of interest. The first features of the regions of interest extracted through the ROI feature extraction module are used as input of the integration analyzer 170.

For example, assuming that the R1 region (radius region) of the hand bone image is a region of interest and an ROI feature extraction module learned through a plurality of radius images is a first ROI feature extraction model 155, the interest image analyzer 150 can calculate the first feature of a region of interest 1 detected by the detector 130 by inputting the region of interest 1 to the first ROI feature extraction model.

An embodiment of the method of calculating the feature of a region of interest using an ROI feature extraction model is described in detail with reference to FIG. 2.

The ROI feature extraction model, which is a deep neural network composed of one or more layers, may be a Convolutional Neural Network (CNN) including a plurality of convolution layers making a feature map for features of regions of interest and a pooling layer performing subsampling among the convolution layers. The CNN can extract features from an input image by alternately performing convolution and subsampling on the input image. The features or feature values mean vector values that show main features that are important for classification or identification of images. According to an embodiment of the present disclosure, the first feature that is input to the integration analyzer 170 may be a value output from one of one or more layers composing a deep neural network or a value that is input to the one layer.

The CNN includes several convolution layers and several subsampling layers, Max-Pooling layers, and Pooling layers, and may include a Global Average Pooling (GAP) layer, a fully-connected layer, and as softmax layer. The convolution layer is a layer that perform convolution on an input image and the subsampling layer is a layer that is mapped to a 2D image by extracting a maximum value or an average value locally from an input image, and the subsampling may be performed after a local region is increased.

The convolution layer requires information such as the size of a kernel, the number of kernels to be used (the number of maps to be produced), and a weight table to be applied to convolution. The subsampling layer requires information about the size of a kernel to be subsampled and whether to select a maximum value or a minimum value from values in a kernel region.

In FIG. 2 showing an exemplary CNN, the CNN includes an integration layer (layer 2) that is subsampled between convolution layers (layer 1 and layer 3) and may include a GAP layer, a fully-connected layer, and a softmax layer at the end. This is for convenience of description, a CNN can be configured by combining layers having different features in various ways, and the present disclosure is not limited by the configuration and structure of the deep neural network.

As described above, the first feature that is calculated by the interest image analyzer 150 may be a value that is output from one of one or more layers composing a deep neural network or a value that is input to one layer, so an embodiment of a case that uses a value that is output from a GAP as a first feature is as follows.

As shown in FIG. 2, in order to obtain an average value of each feature map in a GAP layer of an ROI feature extraction model and transmit the average value to a softmax layer through a fully-connected layer, the interest image analyzer 150 can set an average value vector of each feature map calculated through the GAP as a feature of a corresponding region of interest. In this case, average values ($A^1$, $A^2$, ... $A^K$) of K channel feature maps calculated through the GAP are input as feature values of a region of interest n to the integration analyzer 170.

A feature value at a position (i, j) in the feature map of a channel k is $M_{i,j}^k$, $A^k$ that is the average value of the feature map of the channel k can be expressed as follows.

$$A^k = \frac{1}{\sum_i \sum_j 1} \sum_i \sum_j M_{i,j}^k \qquad \text{[Equation 1]}$$

That is, the feature value of the region of interest n is $F_n + [A^1, A^2, A^3, \ldots, A^K]$ (K=the total number of channels), and the feature values $F_1, F_2, F_3, \ldots, F_N$ (N: the total number of regions of interest) for regions of interest can be input to the integration analyzer 170.

Alternatively, the interest image analyzer 150 can use a value that is input to one of various layers composing a deep neural network as a first feature. For example, it is assumed that, in the embodiment of FIG. 2, the interest image analyzer 150 uses a value that is input to the softmax as a first feature $\acute{F}_N$. The interest image analyzer 150 can input each class score value that is input of the softmax to the integration analyzer to calculate the score of each class for final class classification or a normalized probability value as the feature value of a region of interest. Obviously, it may be possible to set a normalized probability value from a softmax result as the feature value of a corresponding region of interest and input the feature value to the integration analyzer.

In this example, assuming that the score of a class C is $S^C$, $S^C$ can be expressed as follows.

$$S^C = \sum_i^K w_i^c A^i \qquad \text{[Equation 2]}$$

In this equation, K is the total number of channels, $A^i$ is the average value of an i channel feature map, and $w_i^c$ is the weight of $A^i$ for class c.

In this case, the feature value of the region of interest n is $\acute{F}_n = [S^1, S^2, S^3, \ldots, S^M]$ (M=the total number of classes) and feature values for regions of interest $\acute{F}_1, \acute{F}_2, \acute{F}_3, \ldots, \acute{F}_n$ can be input to the integration analyzer 170.

The interest region analyzer 150 can calculate analysis values for regions of interest $I_1, I_2, I_3, \ldots, I_N$, regardless of calculation of the feature values for the regions of interest. This is for providing analysis results on the regions of interest to a user regardless of inputting feature values to the integration analyzer 170. The analysis values for regions of interest calculated by the interest region analyzer 150 can be transmitted to the output unit 190.

The entire image analyzer 160 may be or may not be included in the image analysis system 100 according to an embodiment of the present disclosure and calculates a second feature of a query image by applying the query image to an entire region feature extraction model learned with a plurality of images. That is, the entire region feature extraction model, which is a machine learning frame work learned on the basis of an entire image to extract features of the entire image, is, according to an embodiment of hand bone image analysis, a deep neural network learned in order to be able to determine bone age in accordance with distribution of feature values included in the entire hand bone image by learning and estimating the entire hand bone image for each bone age.

The entire region feature extraction model that is used by the entire image analyzer 160 is different from the ROI feature extraction model in that an input image is not a portion of a query image, but an entire image and it is a neural network learned on the basis of the entire image, but the configuration and learning method may be the same as those of the ROI feature extraction model.

A query image is input intact to the entire image analyzer 160. For example, an image including a hand bone image when the query image is a hand bone image and including the entire shape of a face when the query image is a face image can be input to the entire image analyzer 160. Since only regions of interest extracted through the detector 130 are input to the interest image analyzer 150, only partial regions such as a radius image and an image of the third joint of the third finger bone would input when the query image is a hand bone image. Further, when the query image is a face image, images of detailed regions such as an eye region, a nose region, and a mouth region would be input to the interest image analyzer 150.

As described above, the entire region feature extraction model is also a deep neural network composed of one or more layers, as shown in FIG. 2, and when it is a CNN, it is possible to repeat a process of producing a feature map by performing convolution after disposing a kernel on an input query image or a process of sampling values in the kernel region through subsampling. The entire image analyzer 160 can extracts features of a query image through this process (second feature).

The second feature, similar to the first feature that is input to the integration analyzer 170 from the interest image analyzer 150, may be an input value that is input to a specific layer of one or more layers composing a deep neural network or an output value of a specific layer. Obviously, the second feature may be a resultant value passing through the entire deep neural network. The method of extracting the second feature is the same as that described in relation to the interest image analyzer 150, so it is not described here.

In general, when feature values are calculated using a machine learning model, images are classified with reference to the probability distribution of the feature values. However, the present disclosure has a technical characteristic that is different from that of the related art in that it not only performs learning and classification of images, but increases accuracy in image analysis through a step and a configuration that learns feature values calculated from each deep neural network learned for each specific region of interest to classify images.

The integration analyzer 170 calculates an analysis value of the query image by applying the first feature to a pre-learned integration analysis model. If both of the entire image analyzer 160 and the interest image analyzer 150 are used for image analysis, the integration analyzer 170 can calculate an analysis value of a query image by applying the first feature and the second feature to a pre-learned integration analysis model.

The integration analysis model, which is produced by the integration instructor 147, may be a deep neural network or a machine learning model such as a regression model leaned by one or more features calculated by applying one or more regions of interest extracted from an image to one or more ROI feature extraction model. Alternatively, the integration analysis model may be a neural network, a deep neural network, or a regression model learned with features calculated by applying an image to an entire image feature extraction model and one or more features calculated by applying one or more regions of interest extracted from an image to one or more ROI feature extraction models, respectively.

In other words, the integration analysis model, which is a machine learning model learned with feature values, may be a model trained with a feature (first feature) calculated by regions of interest extracted from a plurality of learning images to an ROI feature extraction model as learning data or the first feature and a feature (second feature) calculated by applying a learning image to an entire image feature extraction model as learning data. Accordingly, an input vector of the integration analyzer 170 can be expressed as $X = [F_1, F_2, \ldots, F_h, \ldots, F_H]$, in which H is the number of regions of interest (including an entire image) and $F_h$ means a feature value of a region of interest h.

For example, when the radius region is a region of interest 1 in hand bone image analysis, the integration instructor 147 can teach feature values of a radius image calculated by applying a plurality of radius images grouped for bone ages or bone maturity grades to a first ROI feature extraction model, to an integration analysis model. That is, the integration analysis model can learn features of feature values of radius images for bone ages through map learning.

Accordingly, when a query image is input later, and the detector 130 extracts a radius image from the query image, the interest image analyzer 150 can extract $F_1$ as the feature vector of a region of interest 1 of the query image. The integration analyzer 170 receiving $F_1$ can identify the bone age corresponding to the feature of $F_1$ by calculating the feature of $F_1$. In this way, the integration analyzer 170 can learn image features for bone ages with the features $F_1, F_2, F_3, \ldots, F_N$ of regions of interest and/or the feature WF of the entire image as learning targets.

In short, integration analysis model that the integration analyzer 170 uses for feature classification may learn only the features of regions of interest or combination of the features of regions of interest and the feature of an entire image. In the later analysis of an image, the integration analyzer 170 can perform classification by receiving not an image, but the feature values of a query image as input values. In this specification, the output of the integration analyzer 170 is referred to as an analysis value of a query image, and it can be actually understood as a classification result of analyzing the query image, that is, the feature vector of the resultant value or the output value of a machine learning model (an entire region feature extraction model and/or ROI feature extraction model) of the query image.

The integration analyzer 170 identifies in image using analysis values. The analysis values may be vector value showing the category of a query image or showing probability of each category, or the resultant values of a regression analysis model.

For example, when a hand bone image is analyzed, analysis values may be vector values showing probability of each bone age and bone age corresponding to the highest probability value in the analysis values may be identified as bone age of the query image or may be bone age value corresponding to a regression analysis model. Accordingly, when an analysis result age of a query image is calculated as 10, as shown in FIG. 1, an analysis value $I_r$ output from the integration analyzer can be calculates as "10" corresponding to a kind of category, and a specific value may be calculated as bone age such as "10.253" when a regression analysis model is used.

The output unit 190 can provide the analysis value of the query image calculated by the integration analyzer 170 and the analysis value for each regions of interest calculated by the interest image analyzer 150 to a user. For example, as indicated by "195" in FIG. 1, the analysis result that is provided to a user may include not only an analysis value $I_r$ of a query image, but all of an analysis value $I_1$ of a first region of interest, an analysis value $I_2$ of a second region of interest, an analysis value $I_3$ of a third region of interest, and an analysis value $I_4$ of a fourth region of interest. "195" in FIG. 1 shows an example of an analysis result of bone age of a query image in which the bone age of a first region of interest is 11, the bone age of a second region of interest is 9, and the bone age of a third region of interest is 12.

The analysis value of a region of interest may be a different kind of value that may influence an analysis value of a query image, that is, has correlation with an analysis value of a query image. If a region of interest is learned with a bone maturity grade rather than a bone age as an identification value when the instructor 140 creates an ROI feature extraction model, an analysis value that is induced by applying a region of interest to the ROI feature extraction model may be a bone maturity grade. In this case, analysis values or bone maturity grades of regions of interest can be provided to a user as analysis values of the regions of interest. For example, the bone maturity grade of the first region of interest can be analyzed as C, the bone maturity grade of the second region of interest can be analyzed as D, and the bone maturity grade of the third region of interest can be analyzed as C. Accordingly, the image analysis system 100 of the present disclosure is effective in that it can provide both of a determination basis and analysis for an image analysis result by providing the bone ages or bone maturity grades of regions of interest together with the bone ages of the query image.

Figure 4:
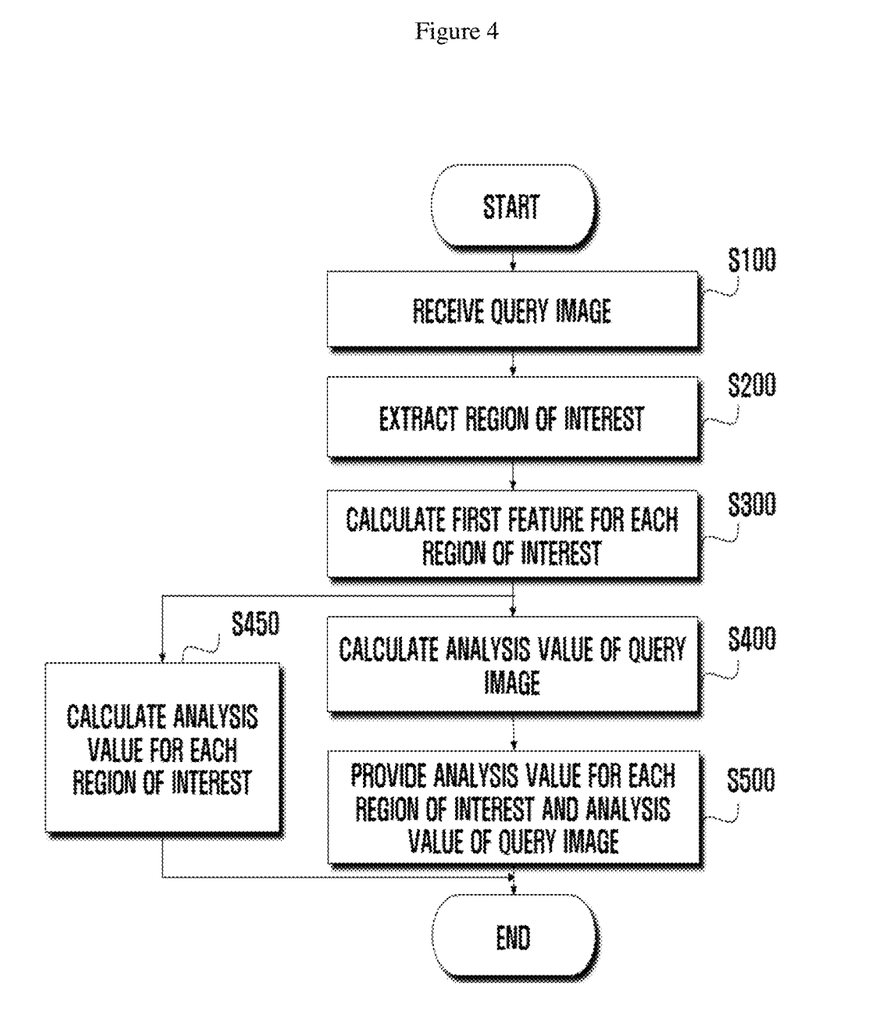
FIG. 4 is a flowchart illustrating an image analysis method according to an embodiment of the present disclosure.
Figure 5:
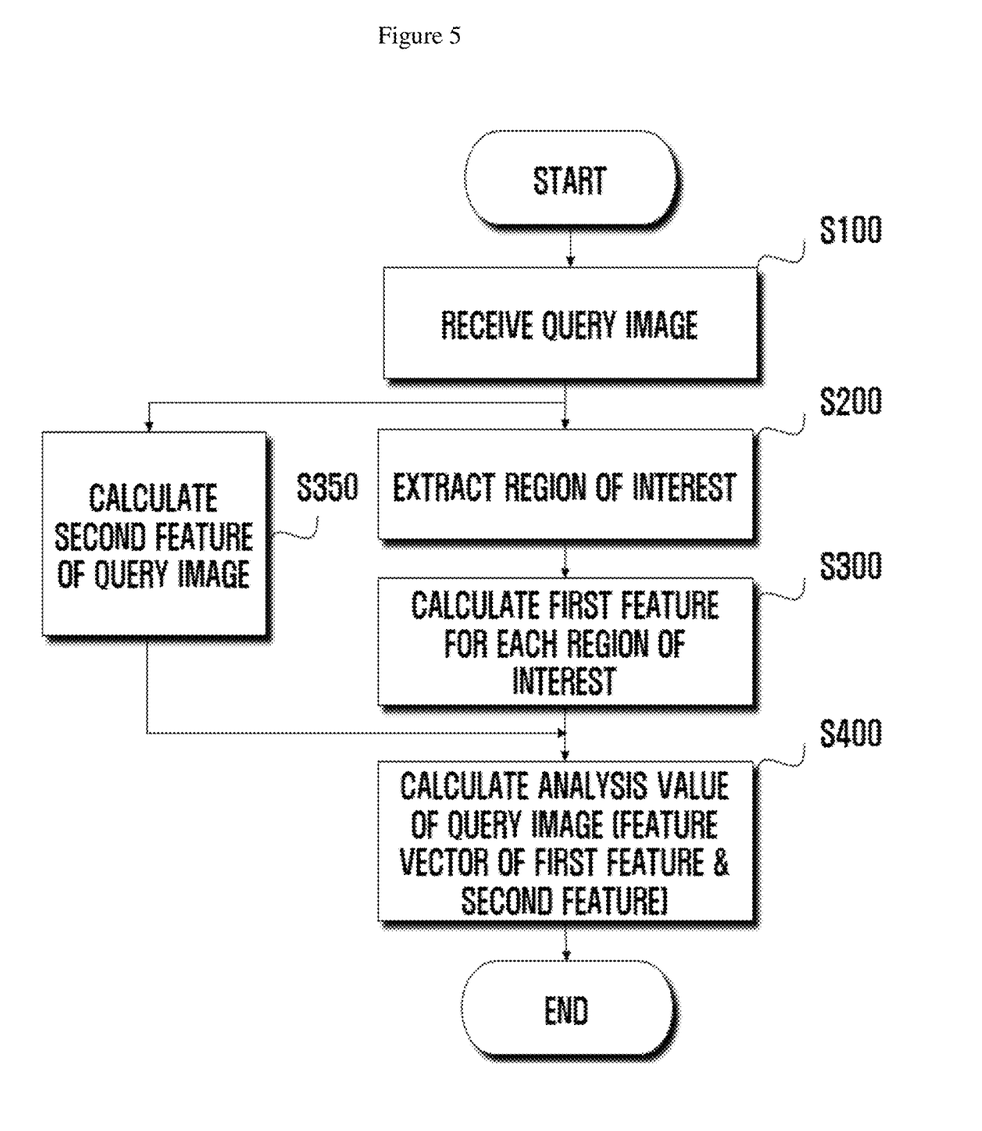
FIG. 5 is a flowchart illustrating an image analysis method according to another embodiment of the present disclosure.

FIGS. 4 and 5 are flowcharts illustrating an image analysis method according to an embodiment of the present disclosure.

Referring to FIG. 4, an electronic device according to an embodiment of the present disclosure can receive query image (S100) and can extract one or more regions of interest from the query image (S200).

In S200, the electronic device can extract a region corresponding to position information set by a user as a region of interest and can extract a region corresponding to a specific region as a region of interest by applying an automatic detection model learned for the specific region to the query image.

The electronic device can calculate a first feature for each region of interest by respectively applying one or more regions of interest to one or more ROI feature extraction models independently learned in order to extract a feature of each region of interest (S300). The ROI feature extraction model may be a neural network composed of one or more layers and the first feature may be a value that is output from any one of the layers or a value that is input to the any one layer.

The electronic device can calculate analysis values for identifying the query image by applying the first feature to a pre-learned integration analysis model (S400). That is, it is possible to calculate analysis values that show what category the query image pertains to, what probability value the query image has, and what value it corresponds to, etc. The integration analysis model is a machine learning model learned with one or more features calculated by applying one or more regions of interest extracted from a plurality of learning images to one or more ROI feature extraction models and the analysis value can be understood as a feature vector of combination of first features or as meaning a category value.

In step 450, the electronic device can calculate analysis values for regions of interest. The analysis values calculated in step 450 may be the same kind of values as the analysis values of the query image or may be different kind of values having correlation with the analysis values of the query image. For example, when bone ages of the query image are induced as analysis values, the analysis values of regions of interest calculated in step 450 may be bone ages of regions of interest or bone maturity grades having correlation with estimation of bone ages. This may depend on what values were used as identification values when the ROI feature extraction models were learned.

The electronic device can provide the analysis values of the regions of interest and the analysis values of the query image to a user in step 500. For example, analysis values may be displayed through a display of the electronic device or may be output through a speaker of the electronic device.

According to the embodiment shown in FIG. 5, the electronic device can calculate first features for regions of interest by extracting regions of interest and calculate second features of the query image by applying the query image to an entire region feature extraction model learned with a plurality of learning images (S350). In this case, in step 400, the electronic device can calculate analysis values of the query image by applying the first features and the second features to an integration analysis model. The integration analysis model is a neural network or a deep neural network learned with features calculated by a learning image to an entire image feature extraction model and one or more features calculated by applying one or more regions of interest extracted from the learning image to one or more ROI feature extraction models, and the analysis values calculated in step 400 can be understood as feature values of combination of the first features and the second features.

Some embodiments omitted in the specification can be applied in the same way when the subjects are the same. The present disclosure can be changed, replaced, and modified in various ways without departing from the spirit of the present disclosure by those skilled in the art, so it is not limited to the embodiments described above and the accompanying drawings.

The invention claimed is:

1. An image analysis method comprising:
   receiving a query image;
   extracting one or more regions of interest from the query image;
   calculating one or more first features for each of the regions of interest extracted from the query image by respectively applying each region of interest to a corresponding ROI (region of interest) feature extraction model independently learned for each region of interest in order to extract the one or more first features for each of the regions of interest;
   calculating one or more second features of an entire query image by applying the query image to an entire region feature extraction model learned with a plurality of entire learning images, wherein the one or more second features are calculated independently from the first features; and
   calculating analysis values of the query image for identifying the query image by applying the one or more first features of each of the regions of interest and the one or more second features of the entire query image to a pre-learned integration analysis model.

2. The image analysis method of claim 1, wherein the integration analysis model is a neural network or a regression model learned with features calculated by applying the learning images to the entire image feature extraction model and one or more features calculated by respectively applying one or more regions of interest extracted from the learning images to the one or more ROI feature extraction model.

3. The image analysis method of claim 1, wherein the ROI feature extraction model is a deep neural network composed of one or more layers and the one or more first features are values that are output from any one of the layers or values that are input to the any one layer.

4. The image analysis method of claim 1, wherein the ROI feature extraction model and the entire region feature extraction model are deep neural networks each composed of one or more layers and the one or more first features and the one or more second features are values that are output from any one of the layers or values that are input to the any one layer.

5. The image analysis method of claim 1, wherein the ROI feature extraction model is learned with using one or more regions of interest classified in accordance with predetermined identification values as training data, and the identification values are the same kind of the analysis values of the query image or different kind of values having correlation with the analysis values of the query image.

6. The image analysis method of claim 1, comprising:
calculating analysis values of regions of interest by respectively applying one or more regions of interest to the one or more ROI feature extraction models; and
providing the analysis values of the query image and the analysis values of the regions of interest to a user.

7. The image analysis method of claim 1, wherein the extracting of regions of interest includes extracting a region of the query image that corresponds to a specific region as a region of interest by applying a learned automatic detection model to the specific region.

8. An image analysis system comprising:
an input unit receiving a query image;
a detector extracting one or more regions of interest from the query image;
an interest image analyzer calculating one or more first features for each of the regions of interest extracted from the query image by respectively applying each region of interest to a corresponding ROI (region of interest) feature extraction model independently learned for each region of interest in order to extract the one or more first features for each of the regions of interest;
an entire image analyzer calculating second features of an entire query image by applying the query image to an entire region feature extraction model learned with a plurality of entire learning images, wherein the one or more second features are calculated independently from the first features; and
an integration analyzer calculating analysis values of the query image by applying the one or more first features of each of the regions of interest and the one or more second features of the entire query image to a pre-learned integration analysis model, and identifying the query image using the analysis values.

9. An image analysis system comprising:
at least one processor; and
at least one non-transitory computer readable medium in communication with the at least one processor, the at least one non-transitory computer readable medium having stored thereon computer software comprising a set of instructions that, when executed by the at least one processor, causes the image analysis system to:
receive a query image;
extract one or more regions of interest from the query image;
calculate one or more first features for each of the regions of interest extracted from the query image by respectively applying each region of interest to a corresponding ROI (region of interest) feature extraction model independently learned for each region of interest in order to extract the one or more first features for each of the regions of interest;
calculate one or more second features of an entire query image by applying the query image to an entire region feature extraction model learned with a plurality of entire learning images, wherein the one or more second features are calculated independently from the first features; and
calculating analysis values of the query image for identifying the query image by applying the one or more first features of each of the regions of interest and the one or more second features of the entire query image to a pre-learned integration analysis model.

10. The image analysis system of claim 9, wherein the integration analysis model is a neural network or a regression model learned with features calculated by applying the learning images to the entire image feature extraction model and one or more features calculated by respectively applying one or more regions of interest extracted from the learning images to the one or more ROI feature extraction model.

11. The image analysis system of claim 9, wherein the ROI feature extraction model is a deep neural network composed of one or more layers and the one or more first features are values that are output from any one of the layers or values that are input to the any one layer.

12. The image analysis system of claim 9, wherein the ROI feature extraction model and the entire region feature extraction model are deep neural networks each composed of one or more layers and the one or more first features and the one or more second features are values that are output from any one of the layers or values that are input to the any one layer.

13. The image analysis system of claim 9, wherein the ROI feature extraction model is learned with using one or more regions of interest classified in accordance with predetermined identification values as training data, and the identification values are the same kind of the analysis values of the query image or different kind of values having correlation with the analysis values of the query image.

14. The image analysis system of claim 9, wherein the set of instructions that, when executed by the at least one processor, further causes the image analysis system to:
calculate analysis values of regions of interest by respectively applying one or more regions of interest to the one or more ROI feature extraction models; and
provide the analysis values of the query image and the analysis values of the regions of interest to a user.

15. The image analysis system of claim 9, wherein the extracting of regions of interest includes extracting a region of the query image that corresponds to a specific region as a region of interest by applying a learned automatic detection model to the specific region.

* * * * *